(12) United States Patent
Siikaniemi et al.

(10) Patent No.: US 7,394,784 B2
(45) Date of Patent: Jul. 1, 2008

(54) PROVIDING PACKET DATA SERVICE IN WIRELESS TELECOMMUNICATION SYSTEM

(75) Inventors: Mikko Siikaniemi, Tampere (FI); Riku Mettälä, Tampere (FI); Jussi Piispanen, Tampere (FI); Mikko Sahinoja, Tampere (FI); Ari Sutinen, Tampere (FI)

(73) Assignee: Nokia Corporation, Espoo (FI)

( * ) Notice: Subject to any disclaimer, the term of this patent is extended or adjusted under 35 U.S.C. 154(b) by 1135 days.

(21) Appl. No.: 10/192,830

(22) Filed: Jul. 10, 2002

(65) Prior Publication Data

US 2003/0021274 A1    Jan. 30, 2003

(30) Foreign Application Priority Data

Jul. 12, 2001    (FI)    ................. 20011529

(51) Int. Cl.
    *H04Q 7/00*    (2006.01)
(52) U.S. Cl. ..................................................... 370/329
(58) Field of Classification Search ................ 370/310, 370/328, 329, 431, 437, 462; 709/227–229; 455/415
    See application file for complete search history.

(56) References Cited

U.S. PATENT DOCUMENTS

| 5,630,081 | A | | 5/1997 | Rybicki et al. |
| 5,745,695 | A | * | 4/1998 | Gilchrist et al. ............. 709/227 |
| 5,875,240 | A | * | 2/1999 | Silverman .............. 379/142.07 |
| 6,125,126 | A | * | 9/2000 | Hallenst.ang.l ............. 370/522 |
| 6,178,183 | B1 | * | 1/2001 | Buskirk, Jr. ................. 370/493 |
| 6,317,607 | B1 | * | 11/2001 | Tomcik et al. ........... 455/552.1 |
| 6,519,252 | B2 | * | 2/2003 | Sallberg ..................... 370/356 |
| 6,560,239 | B1 | * | 5/2003 | Frid et al. .................... 370/426 |
| 6,788,673 | B1 | * | 9/2004 | Koskinen .................... 370/352 |
| 6,816,481 | B1 | * | 11/2004 | Adams et al. ............... 370/352 |
| 6,996,076 | B1 | * | 2/2006 | Forbes et al. ................ 370/310 |

FOREIGN PATENT DOCUMENTS

| EP | 1 021 053 | 7/2000 |
| EP | 1 096 813 A2 | 2/2001 |
| EP | 1 081 971 | 3/2001 |
| WO | WO 98/44640 | 10/1998 |

OTHER PUBLICATIONS

ETSI (European Telecommunications Standards Institute) GPRS standard GSM 03.60 version 7.4.1, "Digital Cellular Telecommunications System (Phase 2+); General Packet Radio Service (GPRS); Service Description; Stage 2"; Release 1998, copyright 2000. (117 pages).

\* cited by examiner

*Primary Examiner*—Dmitry Levitan
(74) *Attorney, Agent, or Firm*—Hollingsworth & Funk, LLP

(57) ABSTRACT

A method for arranging a packet radio service in a wireless telecommunication system comprising at least one mobile station. The method comprises activating in the mobile station at least one packet data context for packet-switched data transmission of an application in the mobile station. In the mobile station, a busy condition is automatically set for the packet data context for suspension situations. When the packet data context in the mobile station is requested to be suspended, the packet data context is prevented from being suspended in response to the packet data context suspension request being received from outside the application.

12 Claims, 2 Drawing Sheets

PROVIDING PACKET DATA SERVICE IN WIRELESS TELECOMMUNICATION SYSTEM

FIELD OF THE INVENTION

The invention relates to providing a packet data service in a wireless telecommunication system, and particularly to preventing a packet data service from being suspended.

BACKGROUND OF THE INVENTION

In order to enable the increasing data transmission needs to be answered, also wireless data transfer services have been improved. In addition to circuit-switched data services, a packet-switched General Packet Radio Service (GPRS) has also been standardized in the GSM system particularly for transferring Internet Protocol (IP) data. A network supporting the GPRS service comprises a Gateway GPRS Support Node (GGSN) and a Serving GPRS Support Node (SGSN). The SGSN is responsible for serving mobile stations MS connected to the GPRS network in its service area, transmitting and receiving data packets from such mobile stations and for monitoring the location of the mobile stations in its service area. When a mobile station MS is connected to the GPRS network, and more precisely to the SGSN, a mobility management context has to be created for the MS; in the GPRS network this function is called GPRS Attach. The GGSN operates as a gateway between the GPRS network and an external Packet Data Network (PDN). External data networks may include e.g. the GPRS network of another network operator, the Internet, X.25 network or a private local area network.

In order to enable packet-switched data to be transmitted between the mobile station and the network, a Packet Data Protocol (PDP) context has to be activated for the mobile station. In the PDP context activation, the MS is tied to a PDP address (typically an IP address), which is used for communicating with external networks. The state of the MS PDP context is then changed to ACTIVE. Since radio resources are consumed only during data transmission, a GPRS mobile station may have its PDP context activated all the time while being connected to the network. When connecting to the GPRS network, mobile stations can also be arranged to automatically activate the PDP context as well.

The GPRS mobile stations can be divided into three classes: class A mobile stations can simultaneously provide both a GSM call and GPRS data transfer, class B mobile stations only enable either a GSM connection or a GPRS service to be active at a time, and class C mobile stations only support the GPRS. A class B mobile station can detect an incoming GSM call also when the PDP context is active. In order to enable a GSM call to be established, a GPRS service is suspended (GPRS suspension), which means that in the mobile station and the GPRS network, data is prevented from being transmitted to the particular mobile station. Applications utilizing the GPRS service are provided (in the mobile station or e.g. in the application server of the network) with different time supervision features. Message arrival times are monitored, and if no reply nor a next message is received within a predetermined time-out period, the application interprets the connection to be lost, in which case the application cannot be continued even if the GPRS service could be continued after the GSM call has been terminated. It can be particularly harmful to suspend a service e.g. in a banking service application.

BRIEF DESCRIPTION OF THE INVENTION

An object of the invention is thus to provide a method and an apparatus implementing the method so as to enable suspension of a packet data service to be avoided at least in certain situations. The objects of the invention are achieved by a method and a mobile station which are characterized by what has been disclosed in the independent claims. Preferred embodiments of the invention are disclosed in the dependent claims.

The idea underlying the invention is that a busy condition is automatically set for a packet data context of a mobile station for suspension situations. When a request is made to suspend the packet data context, the packet data context is prevented from being suspended if the request to suspend the packet data context is received from outside the particular application utilizing the packet data context and a busy condition has been set for the packet radio context. A busy condition refers to any kind of setting (that can be implemented in many ways) which enables a packet data context from being suspended. Preferably, the packet data context can be considered to be suspended if the application requests deactivating the packet data context e.g. while the application is being closed.

An advantage of the method and system of the invention is that the operation of the application utilizing the packet data context is not affected by external interruptions, such as incoming calls. This enables problems caused by suspending the application prematurely to be avoided. Automatic setting of a busy condition means that the mobile station (e.g. an application layer entity) is arranged to set the packet data context as busy with no need for a user to interfere, which results in enhanced usability.

If the packet data context is used for synchronizing data, suspending the packet data context may cause a situation wherein the mobile station and a synchronization server have different synchronized data sets. This means that when synchronization takes place next time, the synchronization has to be so-called slow synchronization where all data units are traversed. According to a preferred embodiment of the invention, a synchronization session can, however, be prevented from being suspended. When a request is made to suspend the synchronization session or the packet data context, the stage of synchronization can be checked in the mobile station. The synchronization session and the packet data context are prevented from being suspended if the synchronization has reached a predetermined threshold stage. This enables slow synchronization caused by suspension and delays and costs caused by data retransmission to be avoided.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

The invention can be applied to any wireless telecommunication system providing packet-switched data transmission services. The following will show a preferred embodiment of the invention in a GSM/GPRS system.

Figure 1:
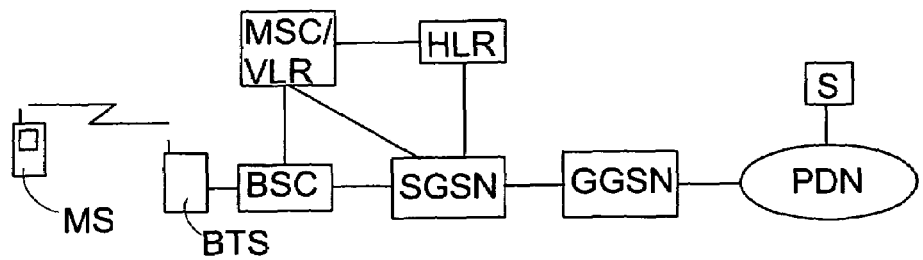
FIG. 1 is a block diagram showing a GPRS system.

FIG. 1 illustrates a wireless telecommunication system comprising a packet-switched GPRS network and a circuit-switched GSM network. Circuit-switched services in the GSM network are provided by a mobile services switching centre MSC/VLR, which is responsible for connection setup and routing calls to correct addresses. Two databases comprising information on mobile subscribers are utilized for this purpose: a Home Location Register (HLR) comprising information on mobile network subscribers and the subscribed services, and a Visitor Location Register (VLR) comprising information on mobile stations visiting the area of a certain mobile services switching centre MSC/VLR.

As described above, the GPRS network comprises SGSNs and GGSNs. Both the SGSN and the MSC/VLR utilize the same Base Station System (BSS). The BSS comprises Base Transceiver Stations (BTS) communicating with mobile stations MS over a radio path, and Base Station Controllers (BSC) controlling the radio frequencies and radio channels available for the base transceiver stations BTS connected thereto. Both the MSC/VLR and the SGSN also use the home location register HLR. A GPRS mobile station MS comprises Terminal Equipment (TE) and a Mobile Termination (MT). Physically, the MT and the TE may be located in a single wireless device, or e.g. a portable computer may constitute the terminal equipment TE and a wireless device the MT. The MT may also be e.g. a device to be connected to a card slot in a computer.

Figure 2:
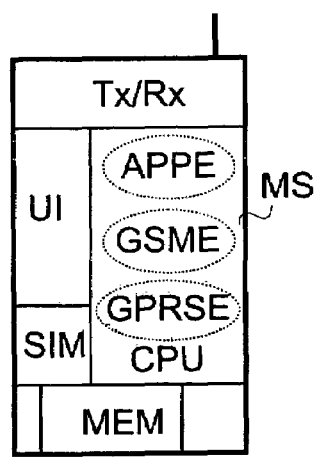
FIG. 2 shows a mobile station according to a preferred embodiment of the invention.

FIG. 2 illustrates the structure of a mobile station MS according to a preferred embodiment of the invention. The MS comprises a transceiver Tx/Rx, which, through an antenna, is responsible for communicating with the base transceiver station BTS. User Interface (UI) means typically comprise a display, keypad, microphone and a loudspeaker. The MS also comprises a Subscriber Identity Module (SIM) for storing e.g. short messages or user-specific settings. A memory MEM in the mobile station MS can be used for storing a computer program code to be executed by a Central Processing Unit (CPU). Using the memory MEM, transceiver Tx/Rx, identity module SIM and the user interface UI, the CPU implements a GSM entity GSME responsible for GSM calls, a GPRS entity GPRSE responsible for GPRS services, and an application entity APPE using a GPRS service provided at least by the GPRS entity. It is to be noted that in addition to the application layer, packet-switched data transmission typically requires a Transport Control Protocol/Internet Protocol (TCP/IP) or a UDP (User Datagram Protocol)/IP stack utilized by the actual application. The APPE may thus comprise e.g. an application layer (e.g. a synchronization application, WWW browser or a banking service application), a Wireless Session Protocol (WSP) of a Wireless Application Protocol (WAP) standard or a Hypertext Transfer Protocol (HTTP) providing transport functions for the application layer, and further, the TCP/IP stack. The application entity APPE can thus also be considered to comprise a functionality implementing the transport layer protocol. The GSME, GPRSE and APPE can be implemented by software, using existing processors and memories; however, hardware solutions can also be used.

Figure 3:
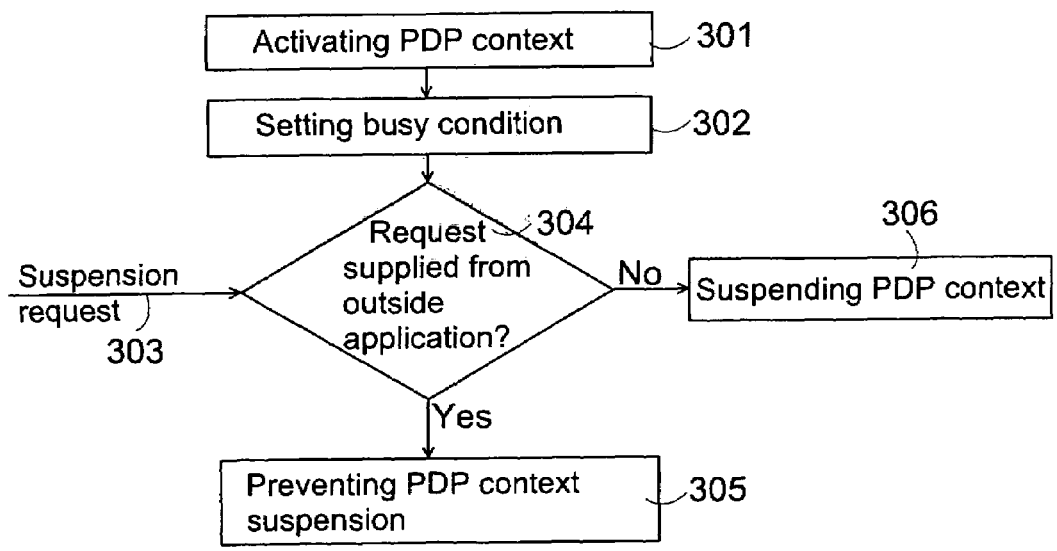
FIG. 3 is a flow diagram showing a method according to a preferred embodiment of the invention.

FIG. 3 is a flow diagram illustrating a method according to a preferred embodiment of the invention. Initiated by a mobile station or a network (Network Initiated PDP Context Activation), a PDP context is activated 301. For a more detailed description of PDP context activation and deactivation, reference is made e.g. to ETSI (European Telecommunications Standards Institute) GPRS standard GSM 03.60 version 7.4.0, "General Packet Radio Service (GPRS); Service Description; Stage 2", pages 50 to 60.

A busy condition is set 302 for the PDP context, according to which condition the PDP context can be prevented from being suspended. The GPRSE can be arranged to set the busy condition already while the PDP context is being activated 301. This can be performed automatically on all PDP contexts, enabling PDP context (and the application utilizing such a context) suspension to be prevented. According to an embodiment, the busy condition can only be set for certain PDP contexts, e.g. according to a Quality of Service (QoS) class to be requested for the PDP context.

The busy condition can also be set application-specifically, in which case PDP context suspension is only denied to certain predetermined applications. A banking application or an e-mail application, for example, can be determined to have uninterrupted operation at all times. The application entity APPE may request the busy condition to be set 302 in certain situations, e.g. when a secure HTTPS connection or a secure WAP connection (Wireless Transport Layer Security WTLS) is being set up. The busy condition can then be set as late as after activating the application entity APPE or while it is establishing a session with an application or another terminal or network server. The application entity APPE can also set the busy condition on the basis of the destination of the connection, typically in accordance with the IP address. Each time a connection is being set up to a Uniform Resource Locator (URL) identifier e.g. of a banking service, an application entity comprising a browser function can request 302 that the busy condition be set. The prevention of service suspension can thus be efficiently set only for certain important situations on the basis of the purpose of use of the PDP context while e.g. incoming calls can be allowed to be set up under other circumstances. The user him- or herself may also request that the busy condition be set 302 if he or she does not want incoming calls to interrupt the operation of the application used.

When the busy condition is set 302 (owing to a GPRSE setting of the GPRS entity or at the request of the application entity APPE), the GPRSE sets the GSM entity to block incoming calls. The application entity APPE may also directly set the GSM entity to block incoming calls. Requests made by the user to suspend the PDP context or the application utilizing such a context can also be prevented. The user is preferably notified of the busy condition being set 302 so that the user knows that incoming calls cannot be answered.

When a request 303 to suspend the PDP context is received, the origin of the request is checked 304. If the request 303 is supplied from outside the application entity APPE that utilizes the PDP context, the PDP context is prevented 305 from being suspended. If the application entity which requested the PDP context activation or which uses the PDP context for data transmission requests that the PDP context be suspended typically because the application layer service ends, the PDP context can be deactivated 306.

According to an embodiment, also PDP context suspension initiated by the user is prevented if the busy condition has been set. Preferably, already the application entity may implement step 305. The application entity APPE then prevents the application from being suspended, in which case the PDP context will not be suspended either. Consequently, the busy condition for preventing the packet data context and the application from being suspended can also be set 302 in the application entity APPE. This embodiment can be used for preventing the user from suspending the application, because e.g. for safety or other reasons, it is not advisable to suspend the application prematurely. For safety reasons, the application and the PDP context can, however, be suspended if the user e.g. requests suspension for the second time or tries to activate an emergency call.

The busy condition can be removed e.g. when the application utilizing the PDP context is closed. It is also possible to use different timers to enable the busy condition to be removed after a predetermined period of time.

Suspending a synchronization session may cause extra costs and delay in particular. In step 304, a synchronization application entity can also check the stage of synchronization if the user requests that the synchronization session be suspended or, due to an incoming call, the PDP context, and thus also the synchronization session, have to be suspended. The synchronization application entity can prevent 305 the synchronization session (and the PDP context) from being suspended if the synchronization has reached a predetermined threshold stage. User-initiated suspension and suspension caused by an incoming call to the mobile station may have different threshold stages.

Synchronization according to a Synchronized Markup Language (SyncML) standard based on an Extensible Markup Language (XML) is set forth as an example without, however, restricting the area of application of the invention thereto. A SyncML client device (e.g. MS) comprises a sync client agent implementing a SyncML protocol. A SyncML server, e.g. server S in FIG. 1, comprises a sync engine and a sync server agent controlling the synchronization.

The first stage in synchronization is called a synchronization initialization stage. During initialization, initialization packages called client initialization packages and server initialization packages are transmitted between the server and the client device (MS). During initialization, the devices authenticate each other and exchange information on the databases to be synchronized and the implementation of the synchronization thereof. Information on a previous synchronization session is also exchanged, which means that the devices send each other synchronization anchors representing the previous synchronization session. Synchronization anchors typically comprise date and time, and on the basis of so-called last anchors, the devices are able to check whether the previous synchronization session was carried out successfully in both devices. If the devices are provided with different synchronization anchors, slow synchronization has to be carried out, which means that all data to be synchronized has to be examined and all data from the client device database to be synchronized has to be transferred to the server. If suspension is requested during the initialization of a synchronization session, the synchronization session and the PDP context can be readily suspended. Consequently, no need exists for slow synchronization in the next synchronization session since no actual data has yet been exchanged during the initialization, so neither of the devices has thus updated its synchronization anchors. After the synchronization session has been suspended, the synchronization application entity (APPE) may request PDP context suspension from the GPRS entity GPRSE.

After the initialization of the synchronization session, the client device (MS) transmits the information on the modifications made in the data in the client device to the server, using a client modifications package. If suspension occurs at this stage, the amount of data already transmitted can be checked. If there is a large amount of data to be transmitted (e.g. more than 100 kilobytes) and most of the data (e.g. 75%) has already been transmitted, it is advisable to prevent the synchronization session from being suspended. The SyncML server synchronizes the data, i.e. analyzes the modifications made to the set of selection data, and uniforms the data units (carries out necessary additions, replacements and deletions). Next, the SyncML server, in bidirectional synchronization, transmits a server modifications package to the client device, the package comprising information on the modifications made to the set of selection data after the synchronization message from the previous server S. However, the client device may calculate the amount of data received by the server. If the amount of received data is large, it is advisable to prevent the synchronization session from being suspended, particularly if it was an incoming call that initiated the suspension request. Since the client device (MS) does not know the amount of data the server has to transmit, it is also possible to check and ask the user whether he or she wants to suspend the synchronization session.

After receiving the modifications made by the server, the terminal modifies the data units as necessary. The last stage in the data transmission procedure is to finalize the synchronization session. The finalization of the synchronization session can be considered to comprise SyncML messages transmitted after transmitting the last synchronization package (depending on the type of synchronization, either server modifications or client modifications). For example in bidirectional synchronization, the synchronization session finalization comprises transmitting a data update status package to the server after receiving the server modifications, and an acknowledgement thereto issued by the server. At the finalization stage, only a small amount of data needs to be transmitted, so when the suspension request is received, the synchronization session is preferably prevented from being suspended at this stage. It does not take long to finalize the synchronization session, so it is advisable to prevent the synchronization session from being suspended irrespective of whether the suspension was requested by the user or the system.

In view of the above, it is preferable to set the threshold stage to be no later than the finalization of the modification stage. In such a case, the synchronization session is not suspended if the mobile station has received server modifications from the server S. The threshold stage can also be set on the basis of the amount of data transferred from or received by the mobile station MS.

According to an embodiment, the synchronization application entity APPE requests from the GPRS entity GPRSE that the busy condition be set 302 for the PDP context used for data transmission of the synchronization session when the threshold stage has been reached. PDP context suspension requests caused by incoming calls can be blocked after this point, so the synchronization session can be completed. If the user requests suspension, the synchronization application entity can prevent the synchronization session from being suspended. User-initiated suspension and suspension caused by an incoming call to the mobile station may have different threshold stages. It is to be noted that the synchronization session suspension can be prevented on the basis of the stage of the synchronization session even if the data transmission were arranged using a circuit-switched connection.

Figure 4:
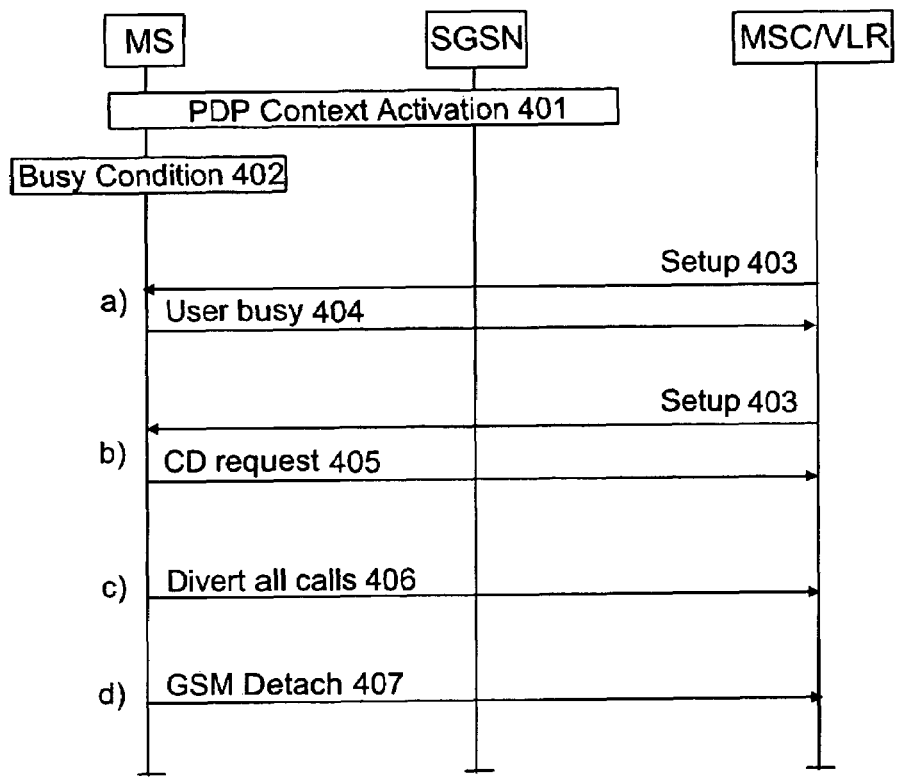
FIG. 4 is a signalling diagram showing how an incoming call is processed according to preferred embodiments of the invention.

FIG. 4 is a signalling diagram illustrating how an incoming GSM call is processed according to an embodiment of the invention. After the PDP context has been activated 401 for data transmission of the application entity, the busy condition is set for an active PDP context 402 as described above, preferably automatically by the application. The busy condition can be set and the PDP context can be suspended in any one of the following ways:

a) In the GSM entity GSME, an indicator is set 402 for the validity time of the busy condition to indicate that a subscriber is busy. When the mobile station receives a call 403, it will not be set up but the GSME returns 404 a reply according to the GSM standard to the [SETUP] message 403, preferably a [RELEASE COMPLETE] message having a cause value 'subscriber busy'. Preferably, caller identification is determined from the [SETUP] message to be presented to the user. A function called 'call forwarding on mobile subscriber busy' (CFB) may have been set in the network subscriber information (in the HLR), which enables the call to be diverted e.g. to a voice mailbox.

b) The GSM entity GSME is set 402 to divert the call to another number during the validity time of the busy condition, using a GSM supplementary service called 'call deflection'. After receiving the [SETUP] message 403 of the call, the MS can thus send 405 the mobile services switching centre MSC/VLR a [CD Request] message comprising the number to which the call is to be diverted.

c) In the setting 402 of the busy condition, the GPRS entity GPRSE temporarily suspends the PDP context and automatically sends 406 the mobile services switching centre MSC/VLR a [Divert All Calls] request, on the basis of which the HLR is set to divert all incoming calls e.g. to a voice mailbox. Next, the PDP context can be resumed. When the busy condition is removed, the GSM entity is arranged to automatically (at the request of the GPRSE) remove the setting in the HLR, after which the incoming calls will again be conveyed to the MS.

d) The GPRS entity GPRSE temporarily suspends the PDP context and sends 407 the mobile services switching centre MSC/VLR a request to remove the MS from the GSM network, i.e. to remove the mobility management context from the VLR, using an [IMSI Detach] message. Next, the calls designated to the MS terminate in accordance with the HLR supplementary service settings. When the busy condition is removed, the GSM entity can preferably automatically (at the request of the GPRSE) be arranged to request that the mobile station MS be connected to the GSM network mobility management, using a location update request.

Figure 5:
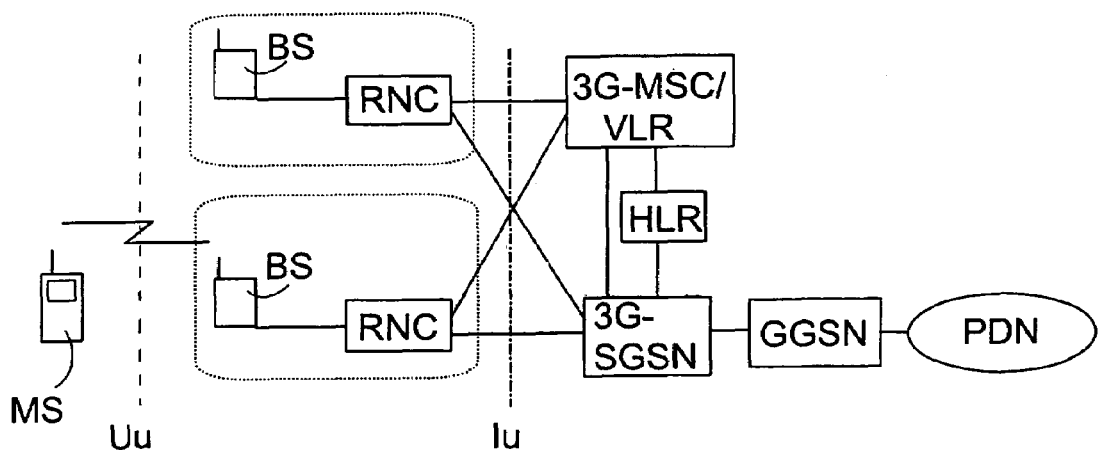
FIG. 5 shows a third generation UMTS system.

The invention can also readily be applied to other systems providing packet radio services, e.g. to the third generation Universal Mobile Telecommunications System (UMTS) shown in FIG. 5. The system comprises user equipment MS supporting a radio interface Uu according to a Wideband Code Division Multiple Access (WCDMA) technology, base stations BS (a base station is typically called node B), and radio network controllers RNC controlling the base stations. A core network having interface Iu comprises a third generation mobile services switching centre 3GMSC/VLR for circuit-switched connections, and a third generation support node 3G-SGSN and a gateway node GGSN for transmitting packet-switched data.

It will be readily apparent to one skilled in the art based on the description provided herein that as technology advances, the basic idea of the invention can be implemented in many different ways. The invention and its embodiments are thus not restricted to the examples described above but they may vary within the scope of the claims.

The invention claimed is:

1. A method for arranging a packet radio service in a wireless telecommunication system comprising at least one mobile station, the method comprising:

activating in the mobile station at least one packet data context for packet-switched data transmission of an application in the mobile station, setting a busy condition automatically for the packet data context in the mobile station for suspension situations, arranging a synchronization session using the packet data context, requesting suspension of the packet data context or the synchronization session by an incoming circuit-switched call to the mobile station, checking the stage of synchronization in response to the request to suspend the synchronization session or the packet data context, and preventing in the mobile station the packet data context and the synchronization session from being suspended in response to the synchronization session having reached a predetermined threshold stage and the packet data context suspension request being received from outside the application and the busy condition being set, and wherein the circuit-switched call is diverted to another number.

2. The method of claim 1, wherein the busy condition is set automatically when activating the packet data context.

3. The method of claim 1, wherein the busy condition is set automatically only for certain predetermined applications.

4. The method of claim 1, wherein the busy condition is set at the request of the application utilizing the packet data context.

5. The method of claim 1, wherein the request to suspend the packet data context is initiated by a user.

6. The method of claim 1, wherein the circuit-switched call is diverted to a voice message system.

7. The method of claim 1, wherein caller identification is determined, and the call is rejected.

8. The method of claim 7, wherein the circuit-switched call is diverted to another number.

9. The method of claim 7, wherein the circuit-switched call is diverted to a voice message system.

10. A mobile station configured to:

activate at least one packet data context for packet-switched data transmission of an application in the mobile station, set a busy condition automatically for the packet data context in the mobile station for suspension situations, arrange a synchronization session, using the packet data context, receive a request to suspend the packet data context or the synchronization session, check the stage of synchronization in response to the request to suspend the synchronization session or the packet data context, and prevent the packet data context and the synchronization session from being suspended in response to the synchronization session having reached a predetermined threshold stage and the packet data context suspension request being received from outside the application and such a busy condition being set.

11. The mobile station of claim 10, wherein the mobile station is further configured to set a busy condition at the request of the application utilizing the packet data context.

12. The mobile station of claim 10, wherein the mobile station is further configured to receive a setup message of an incoming call, determine caller identification and present it to a user, and reject the call in response to the busy condition being set.

* * * * *